United States Patent [19]

Hall et al.

[11] 4,397,440

[45] Aug. 9, 1983

[54] VEHICLE SEAT HAVING HEIGHT ADJUSTMENT, AUTOMATIC WEIGHT ADJUSTMENT AND PROTECTED RIDE ZONE

[75] Inventors: Garth O. Hall; Harvey N. Tengler, both of New Berlin, Wis.

[73] Assignee: UOP Inc., Des Plaines, Ill.

[21] Appl. No.: 202,910

[22] Filed: Nov. 3, 1980

[51] Int. Cl.³ .......................................... F16M 13/00
[52] U.S. Cl. ..................................................... 248/550
[58] Field of Search ................................. 248/550, 567

[56] References Cited

U.S. PATENT DOCUMENTS

| | | | |
|---|---|---|---|
| 3,150,855 | 9/1964 | Carter et al. | 248/550 |
| 3,325,136 | 6/1967 | Radke et al. | 248/400 |
| 3,356,413 | 12/1967 | Radke et al. | 297/300 |
| 3,638,897 | 2/1972 | Harder, Jr. et al. | 248/400 |
| 3,661,176 | 5/1972 | Lowe | 248/550 |
| 3,951,373 | 4/1976 | Swenson et al. | 248/550 |
| 3,954,245 | 5/1976 | Costin | 248/400 |
| 4,022,411 | 5/1977 | Rumsey | 248/400 |
| 4,198,025 | 4/1980 | Lowe et al. | 248/550 |

*Primary Examiner*—Francis K. Zugel

*Attorney, Agent, or Firm*—James R. Hoatson, Jr.; Barry L. Clark; William H. Page, II

[57] ABSTRACT

Improved mounting system for a vehicle seat having an air spring suspension includes a time delay valve means which cooperates with a linkage carried by the seat lower base to automatically position the seat upper base at the same vertical "mid-ride" position of the suspension regardless of the weight of the seat occupant. The system also includes an adjustable linkage which can be activated by the occupant before or after he is seated to reposition the seat upper base to a new "mid-ride" position of the suspension which can be adjusted in height relative to the floor of the vehicle in a range above or below a predetermined mid-range position. The system further includes a structure for providing a "protected" ride zone which has substantially the same movement range above and below the "mid-ride" position regardless of the occupant's weight or the adjusted position of the height adjustment linkage. When the seat is not being vibrated, the occupant will, regardless of the position of the height adjustment means, always be positioned at the "mid-ride" or center position of the ride zone.

6 Claims, 3 Drawing Figures

VEHICLE SEAT HAVING HEIGHT ADJUSTMENT, AUTOMATIC WEIGHT ADJUSTMENT AND PROTECTED RIDE ZONE

BACKGROUND OF THE INVENTION

The invention relates to vehicle seats and particularly to seat support structures of the gas spring type which include a time delay valve for automatically adjusting the seat to a uniform height for any weight occupant as well as a linkage for varying the seat height within a range. Some patents which include these features are: Harder, Jr. et al. U.S. Pat. No. 3,638,897, Swenson et al. U.S. Pat. No. 3,951,373, Costin U.S. Pat. No. 3,954,245 and Rumsey U.S. Pat. No. 4,022,411. In each of these patents the gas spring permits the seat upper to have an extended vertical range of operation which must be of sufficient amplitude to include not only the total range of height adjustment but at least a predetermined amount of dynamic movement above and below the upper and lower limits of the height adjustment range. For example, for a typical seat having a 6½" overall amplitude of movement in its ride zone, the height adjustment range might be approximately 2½" so that when the height is adjusted to either the upper or lower extreme of its range, there would still be at least 2" of dynamic movement range available to an occupant seated in the ride zone in both the upper or lower direction. Thus, for the range dimensions just noted, there would be 2" of movement space available above the "mid-ride" position and 4½" of space below the "mid-ride" position when the seat height is adjusted to the top of its range. Conversely, when the seat is adjusted to the bottom of its range there would be 2" of movement space available below the "mid-ride" position and 4к" of space available above the "mid-ride" position. The excess movement capability in one direction which is necessary to accommodate the height adjustment feature can cause the occupant to have his feet and arms lifted from the foot pedals and steering wheel significantly more than if the ride zone were limited to about 2" on either side of the "mid-ride" position. Furthermore, where the excess movement is in the upper direction, as it would be when the seat is adjusted to the bottom of its height adjustment range, there is the possibility that in a cab with limited ceiling height, a tall person could bump his head on the ceiling. It is known that in a typical suspension seat having a parallelogram or scissors linkage lifting the seat cushion parallel to the floor, a 4" or 100 mm dynamic movement range is quite adequate and should not be substantially exceeded in order to provide effective vibration isolation to a seat occupant while permitting him to retain comfortable control of the floor pedals and steering wheel. Accordingly it would appear desirable to provide a seat support structure which provides the automatic weight adjustment and occupant controlled height adjustment features of prior art seats but with a "protected" ride zone which provides a dynamic movement range which preferably does not exceed about 4" and comprises about 2" above and below the "mid-ride" position of the seat, regardless of movement of the height adjustment. Radke et al. U.S. Pat. No. 3,325,136 assigned to a common assignee, does disclose a "protected" ride zone, but the weight adjustment which centers an occupant of any weight in the ride zone is not automatic in that the occupant must manually squeeze an operating trigger lever to actuate the air valve. The design is somewhat less than completely satisfactory since it not only requires positive acts on the part of the occupant to achieve the weight adjustment, but requires movement of a rotary handle downwardly to go up and upwardly to go down. When the occupant leaves the seat, the seat will naturally rise about 2" to the top of its stroke where it will not only appear to be out of position when unloaded, but will make re-entry to the seat more difficult by reducing the space between the steering wheel and the seat. Where such a suspension is on a passenger seat and no passenger is occupying it, it can rattle somewhat as it vibrates relative to its "up" stop.

Although it has been noted that a dynamic movement range of 4" or less is preferable, such a range could be exceeded without loss of operator control in seats of the type wherein the suspension causes the seat cushion to tilt as it goes up and down in such a manner that the occupant's knee joints or ankle joints remain fixed relative to the floor. Examples of such structures are shown in Radke et al. U.S. Pat. No. 3,356,413 and in Barley Ser. No. 39,636 filed May 16, 1979 and assigned to a common assignee.

SUMMARY OF THE INVENTION

The embodiment of the invention described herein overcomes the noted deficiencies of the various prior art seats of which applicants have knowledge and provides the seat occupant with not only automatic positioning to the center of the "ride-zone" irrespective of his weight, but a lever type height control wherein the simple act of moving the lever up or down will raise or lower the seat correspondingly. The height adjustment linkage includes a toothed rack element which is carried by the seat upper member and a vertically movable link which is mounted to a pair of pivot links carried by the upper and actuated by a height adjustment control lever. The vertically movable link includes a rack engaging pin at its upper end, a contact pin at its lower end which rides in a vertical slotted member carried by the seat base to limit the length of the "ride zone", and an intermediate pin which transmits the movement of the vertically movable link to the time delay valve which controls the flow of air to or from the gas spring. As long as excursion movements of the vertically movable link in either direction from the center of the "ride zone" are of shorter duration than about three seconds, it can be assumed that they are produced by vehicle vibrations and the time delay will not permit air to be added or dumped from the gas spring. Thus, the occupant will have a "protected ride zone" of about 100 mm length as determined by the maximum travel path of the contact pin in the vertical slotted member. When the vertically movable link is moved to a position below or above the "mid-ride" position where the contact pin is centered in the vertical slot for a period of more than about three seconds, the time delay valve will add air to the air spring or dump it so that the contact pin will be raised or lowered respectively to its "mid-ride" position. This movement would typically take place as an occupant sits down on the seat or leaves it. The movement would also take place about three seconds after the height adjustment lever is actuated to move the rack engaging pin downwardly or upwardly from one position on the toothed rack to another, since such action would simultaneously move the contact pin down or up in its slot. Since the seat will be centered in its "ride-zone" when occupied by an occupant of any weight or when unoccupied, it is obvious that the height adjustment can be made either before or after the seat is occupied. When the adjustment is made before the seat is occupied, the setting of the lever can be observed visually. When the adjustment is made with the occupant seated, the three second delay provided by the time delay valve permits the occupant to feel the number of teeth or detents in the rack which the rack pin is passing by before the seat starts to move and thus allows the occupant to more easily adjust the final height.

DETAILED DESCRIPTION OF THE PREFERRED EMBODIMENT

Figure 1:
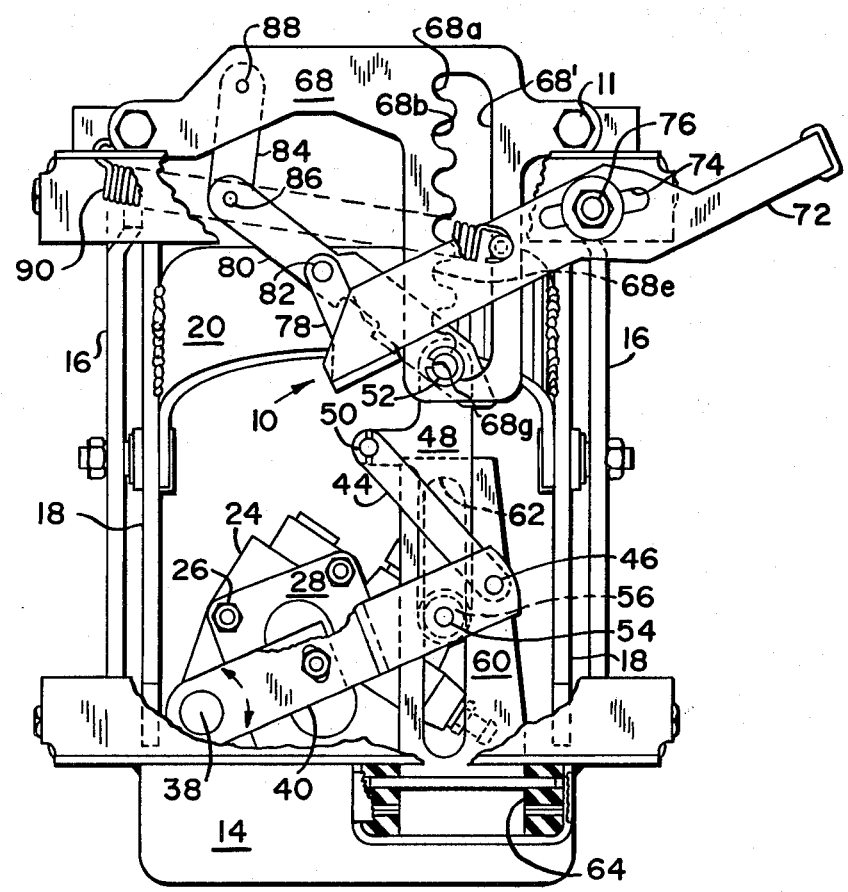
FIG. 1 is a front view of the improved mechanism showing the seat suspension in its "mid-ride" position and with its height adjusted to its highest position.
Figure 2:
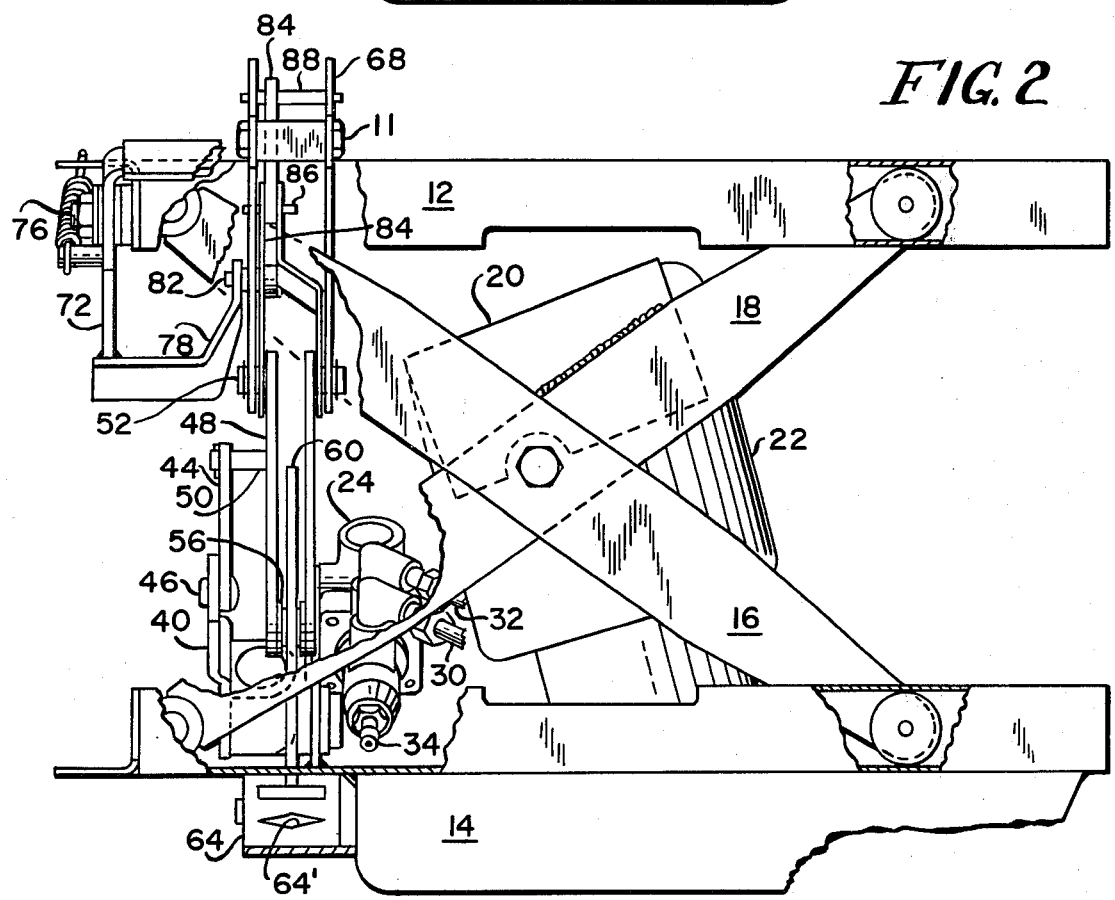
FIG. 2 is a side view of the mechanism of FIG. 1.

Referring to FIGS. 1 and 2, the improved assembly of elements which cooperate to provide automatic weight adjustment, height adjustment and a protected ride zone are indicated generally at 10. The assembly 10 is attached such as by bolts 11 at its upper end to the upper guide rails 12 of the seat upper member. The upper guide rails 12 and the seat upper are adapted to move vertically so as to isolate vertical vibrations which are transmitted to the seat base 14 from the vehicle in which the seat is mounted. The vertical movement of the upper rails 12 is guided and restrained by spaced pairs of pivoted scissors links 16, 18 in the usual fashion. An upper plate member 20, which is welded between the pair of scissors links 18 forms the upper support for an air spring 22; the air supply for spring 22 is controlled by an air valve 24 so as to balance the weight of the seat and its occupant so that the seat is normally positioned in a "mid-ride" position wherein it can travel an equal distance upwardly or downwardly to isolate the occupant from vibrations. The air valve 24 is mounted by bolt 26 to a bracket member 28 which is affixed to the seat base. An inlet hose 30 connects a source of compressed air (not shown) to the air valve 24 and a hose 32 connects the air valve to the air spring 22. An exhaust fitting 34 is adapted to be attached to a hose (not shown) so that air can be exhausted externally of the vehicle. A valve actuator shaft 38 within the valve 24 is internally spring biased to the neutral "mid-ride" position shown in FIGS. 1 and 2 in which the hose 32 going to the air spring 22 is sealed relative to both the incoming air line 30 and the exhaust line 34. However, when the actuator shaft 38 is actuated to move in a counter-clockwise direction, as indicated by the arrow, by lifting of the valve lever 40, the valve will, after about a three-second time delay connect the line 32 to the exhaust line 34 so as to dump air from the air spring 22. Naturally, when air is dumped from the spring, it will have a decreased ability to support the load on it and the upper guide rails 12 will drop until the lever 40 resumes the "mid-ride" position shown in FIGS. 1 and 2 at which time air flow in either direction through line 32 will cease. Similarly, downward movement of the lever 40 will cause the actuator shaft 38 to rotate in a clockwise direction as indicated by the arrow in FIG. 1 and will, after about a three-second delay, connect the air line 30 to the line 32 so as to increase the air in the spring 22 so that it can lift the upper guide rails 12 and return the lever 40 to its "mid-ride" position. Movements of the seat upper are constantly transmitted to the valve lever 40 by an intermediate link member 44 which is pivoted to the lever 40 at its lower end by a lower pin member 46 and at its upper end to a vertically movable link member 48 by a drive pin 50. The vertically movable link member 48 comprises a pair of spaced and parallel plates which carry horizontal height adjustment pins 52 at their upper ends and are joined at their lower ends by a contact member or pin 54 which is preferably covered by an elastomeric element 56. The vertically movable link member 48 has its plates spaced so as to straddle opposite sides of a vertical slotted member 60. The member 60 has an elongated slot 62 whose top and bottom can contact the elastomeric covered contact pin 54 so as to define the "up" and "down" stops of the vertical suspension, thus defining the overall length of the "protected ride zone". Additional cushioning of the suspension against its stops is provided by mounting the flanged base of the vertical slotted member 60 in a block of elastomeric material 64 which preferably has a hollow opening 64' in its interior to absorb the material being compressed.

Figure 3:
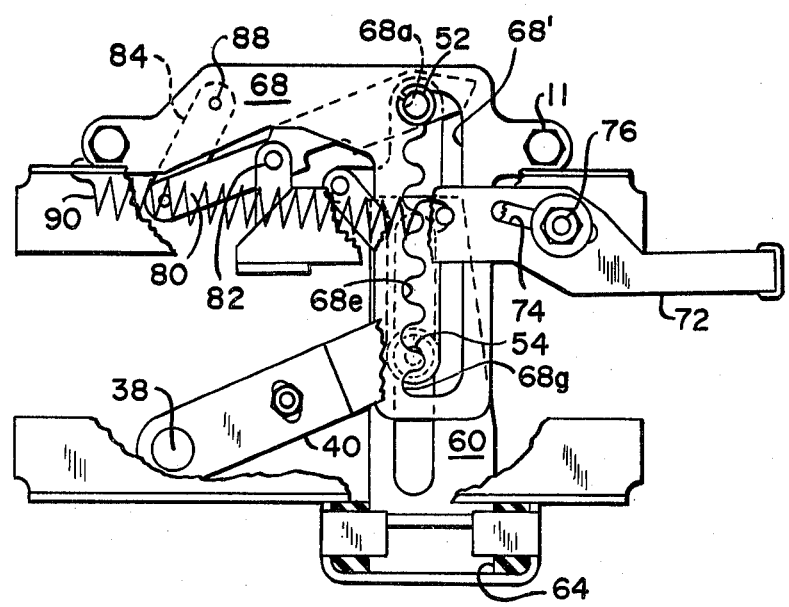
FIG. 3 is a front view of the improved height adjustment mechanism adjusted to its lowest position with other portions of the seat omitted for clarity and with the seat suspension in its "mid-ride" position.

The aforementioned height adjustment pins 52 are adapted to cooperate with a plurality of rack teeth openings 68a–68g in a pair of spaced, rigid rack members 68 which are fixed to the upper guide rails 12 by the bolts 11. The pins 52 are resiliently biased into the rack teeth so that any selected position of height adjustment can be maintained. The assembly is shown in FIGS. 1 and 2 with the guide rails 12 in their uppermost position wherein the pins 52 engage the lowermost teeth 68g. In FIG. 3, the assembly is shown at its lowest position of height adjustment wherein the height adjustment pins 52 are engaged in the uppermost rack teeth 68a. Movement of the pins 52 to vary the height adjustment is accomplished by the manually operated height adjustment lever 72. The lever includes an elongated slot 74 which permits it to both pivot and slide relative to a pivot pin 76 which is fixedly mounted relative to the rack member 68. The inner end of the lever 72 has a bent, generally vertically extending portion 78 which is pivoted to the midpoint of an elongated link member 80 by a pin 82. The right end of the elongated link 80, as it is shown in FIG. 1, is pivoted to the vertically movable link member 48 by the height adjustment pins 52, while the left end is pivoted to a link member 84 by a pin 86. The link 84 is, in turn, pivoted to the rack member 68 by a pin 88. A spring 90 serves to maintain the height adjustment pins 52 in engagement with one of the rack teeth 68a through 68g on each of the spaced racks and is connected in tension between a member attached to the rack member 68 and to a pin 92 carried by the height adjustment lever 72. By pulling the handle 72 to the right in FIG. 1, the pins 52 will be moved into the vertical slot 68' and then the handle can be pushed down to cause its left end to rise and lift the pins 52 to a selected position of adjustment, at which point release of the handle will permit the spring 90 to force the pins into the rack.

As previously discussed, vertical isolation in any position of seat height adjustment will be provided in a "protected" ride zone whose total length is always limited to the travel path of contact pin 54 and its elastomeric covering 56 within slot 62. Preferably, the ride zone is about 50 mm above and 50 mm below the "mid-ride" position illustrated in the drawings. As long as excursions of the seat, and thus of the lever 40, either above or below the "mid-ride" position do not exceed about three seconds, the amount of air in the spring 22 will remain constant. Since the frequency of vehicle vibrations is typically substantially less than three seconds, the valve 24 will usually only operate to add or dump air when the weight on the seat changes, such as by an occupant sitting down on it or leaving it. Obviously, since the contact pin 54 will be in its "mid-ride" position in slot 62 when the seat is unoccupied, the weight of an occupant would compress the spring 22, move the pin 54 towards the bottom of slot 62 and, after three seconds, cause air to be switched by the valve 24 from inlet hose 30 to the spring 32 until the pin 54 returned to its "mid-ride" position.

Actuation of the height adjust lever 72, such as by moving pin 52 from the lowest rack tooth 68g (FIG. 1) to a higher tooth such as 68e, will not immediately lower the seat even though the contact pin 54 is simultaneously moved up in the slot 62, due to the time delay. However, after the three-second time delay, the contact pin will move down to its "mid-ride" position and since the pin 52 will move with it, the rack member 68 and the seat upper connected to it will also move down. The delay can thus give the occupant a short time in which to feel how much he is moving the pin 52 in the rack before he is distracted by the actual movement of the seat.

We claim as our invention:

1. A suspension type vehicle seat of the type having a lower seat base, an upper seat base, linkage means for supporting said upper seat base and permitting it to move in a restrained manner and generally vertically relative to said lower seat base, gas spring means for biasing said upper seat base upwardly, a vertically slotted member mounted on said lower seat base, a complementary contact member movable vertically within said slotted member between an up-stop and a down-stop so as to define a protected ride zone for the upper seat base, said contact member being mounted at the lower end of a vertical link whose upper end carries a height adjustment locking pin which may be selectively positioned in locking engagement with one of a plurality of teeth in a vertical height adjustment rack member mounted on said upper seat base, said locking pin being further supported by one end of a first link which is pivotally attached at said one end relative to said vertical link and locking pin and at its other end to a second link which is pivotally attached to said upper seat base, a manually operated height control lever having a manually engageable handle at one end and a pivot attachment to said first link at its other end, said height control lever having a pin and slot connection intermediate its ends to said upper seat frame, a resilient spring member being attached to said height control lever and to said upper seat base to normally bias said locking pin into engagement with one of the teeth on said rack member, said height control lever being manually longitudinally movable against the bias of said spring member to remove said locking pin from said one tooth so that said height control lever can be pivoted at said pin and slot connection to move said first link and the locking pin attached thereto into engagement with a different tooth on said rack member, valve means connected to said gas spring means for controlling the flow of gas to or from said gas spring means in order to raise or lower said upper seat base, activator means connected to said valve means and mounted on said seat so as to move in response to vertical movement of said vertical link above or below a "mid-ride" position wherein said contact member carried by said vertical link is centered in said protected ride zone between said up-stop and said down-stop, and time delay means for preventing said valve means from being actuated by said activator means to control the flow of gas to or from said spring when said contact member is moving within said protected ride zone in response to normal vehicle vibrations.

2. The seat of claim 1 wherein said pin and slot connection comprises a slot formed in said height control lever and a pin mounted on said upper seat frame.

3. The seat of claim 2 wherein said height control lever is mounted so that an upward pivotable movement of its manually engageable handle will move said locking pin downwardly relative to said rack while a downward pivotable movement will raise said locking pin relative to said rack.

4. The seat of claim 3 wherein said time delay is of a duration of at least about three seconds, thereby enabling the locking pin to be adjustably repositioned in the rack by the height control lever, with the seat either occupied or not occupied, before the valve means is actuated to move the upper seat base relative to the lower seat base.

5. The seat of claim 1 wherein said valve means includes a rotary actuator shaft which is spring biased to a centered position when said contact member is positioned in its "mid-ride" position in said vertically slotted member, said activator means comprising a pair of connected links whose free ends are attached, respectively, to said rotary actuator shaft and to said vertical link, said rotary actuator shaft being ineffective in control the flow of gas into or out of said valve except when it is positioned to one side of its centered position for a period of time in excess of that provided by the time delay means.

6. The seat of claim 1 wherein said vertically slotted member is mounted to said lower seat base by an elastomeric block which provides a cushioning effect when either the upper or lower end of the slot in said member is engaged by said contact member.

\* \* \* \* \*